US012589412B2

(12) United States Patent
Perekresnyi

(10) Patent No.: US 12,589,412 B2
(45) Date of Patent: Mar. 31, 2026

(54) APPARATUS FOR DRY GRANULAR MIXTURES SEPARATION

(71) Applicant: Artem Perekresnyi, Rivne (UA)

(72) Inventor: Artem Perekresnyi, Rivne (UA)

( * ) Notice: Subject to any disclaimer, the term of this patent is extended or adjusted under 35 U.S.C. 154(b) by 0 days.

(21) Appl. No.: 18/840,024

(22) PCT Filed: Dec. 1, 2022

(86) PCT No.: PCT/IB2022/061670

§ 371 (c)(1),
(2) Date: Aug. 20, 2024

(87) PCT Pub. No.: WO2023/156845

PCT Pub. Date: Aug. 24, 2023

(65) Prior Publication Data

US 2025/0170614 A1 May 29, 2025

(30) Foreign Application Priority Data

Feb. 21, 2022 (UA) .............................. a 2022 00791

(51) Int. Cl.
*B07B 13/11* (2006.01)
*B07B 13/00* (2006.01)

(52) U.S. Cl.
CPC ............ *B07B 13/11* (2013.01); *B07B 13/003* (2013.01)

(58) Field of Classification Search
CPC ....... B07B 13/11; B07B 13/003; B07B 13/04; B04C 1/00; B04C 3/00
USPC .......................................................... 209/606
See application file for complete search history.

(56) References Cited

U.S. PATENT DOCUMENTS

| | | | | | |
|---|---|---|---|---|---|
| 815,856 | A * | 3/1906 | Nitcher | B07B 13/11 | 193/12 |
| 1,515,776 | A * | 11/1924 | Krussow | B07B 13/11 | 209/362 |
| 1,698,101 | A * | 1/1929 | Merrifield | B04C 3/00 | 209/725 |
| 2,194,361 | A * | 3/1940 | Linder | B04C 1/00 | 55/424 |
| 2009/0283455 | A1* | 11/2009 | Lean | B03B 13/00 | 209/555 |

(Continued)

FOREIGN PATENT DOCUMENTS

| | | | |
|---|---|---|---|
| CN | 105499140 | A | 4/2016 |
| DE | 89529 | C | 7/1895 |
| DE | 2021 4115 | U1 | 2/2004 |

(Continued)

OTHER PUBLICATIONS

International Search Report received in International Application No. PCT/IB2022/061670, dated Jul. 6, 2023.

(Continued)

*Primary Examiner* — Michael McCullough
*Assistant Examiner* — Jessica L Burkman
(74) *Attorney, Agent, or Firm* — Knobbe, Martens, Olson & Bear, LLP

(57) ABSTRACT

An apparatus is proposed for separation of dry granular mixture into fractions with different content of particles of high density, where the spatial inhomogeneity of the concentration of dense particles in the volume of the mixture is created by rotating the dry granular mixture inside the channel curved along the spiral.

4 Claims, 6 Drawing Sheets

(56) References Cited

U.S. PATENT DOCUMENTS

| | | | | |
|---|---|---|---|---|
| 2014/0044967 | A1* | 2/2014 | Ayers | B07B 13/11 428/402 |
| 2016/0167058 | A1 | 6/2016 | Collier | |

FOREIGN PATENT DOCUMENTS

| | | | |
|---|---|---|---|
| JP | S5326475 | A | 3/1978 |
| SU | 715150 | A1 | 2/1980 |
| WO | WO 2003 011483 | A1 | 2/2003 |
| WO | 2018090039 | A1 | 5/2018 |

OTHER PUBLICATIONS

Written Opinion of the Examiner received in International Application No. PCT/IB2022/061670, dated Jul. 6, 2023.

International Preliminary Report on Patentability dated Jun. 13, 2024 in PCT/IB2022/061670.

* cited by examiner

APPARATUS FOR DRY GRANULAR MIXTURES SEPARATION

FIELD OF THE INVENTION

The present invention relates to a devices for separating dry granular mixtures of particles of different densities into fractions differing in the content of dense particles.

BACKGROUND OF THE INVENTION

In patents AU2002355613, NZ530680, US20040251181, CN1547514, EP1412103, WO/2003/011483, Kurt Liffman and Guy Parker Metcalfe III disclosed a method and apparatus for fractioning a granular mixture of particles of different densities by tumbling the granular mixture to produce continuous or discrete avalanches in the surface of the granular mixture. These avalanches move particles of higher density toward the center of the volume of the granular mixture, and conversely move particles of lower density radially outward from the center of the volume of the granular mixture. The separation of the granular mixture is performed inside a cylindrical apparatus equipped with a means for rotating the apparatus and for extracting fractions from certain parts of the mixture volume. A significant disadvantage of the previously disclosed apparatus is the need for additional means to remove particles of different densities from different regions of the volume of the mixture. In contrast to the aforementioned patents, the apparatus disclosed below needs no additional means to remove particles of different densities from different regions of the volume of the mixture.

DISCLOSURE OF THE INVENTION

A preferred embodiment of the disclosed apparatus is selected from a set of possible embodiments for the purpose of simplicity to disclose the invention, to explain the processes occurring inside the apparatus, to demonstrate the technical result and to demonstrate the possibility of industrial application of the apparatus. This preferred embodiment does not preclude other embodiments corresponding to this disclosure.

Figure 1:
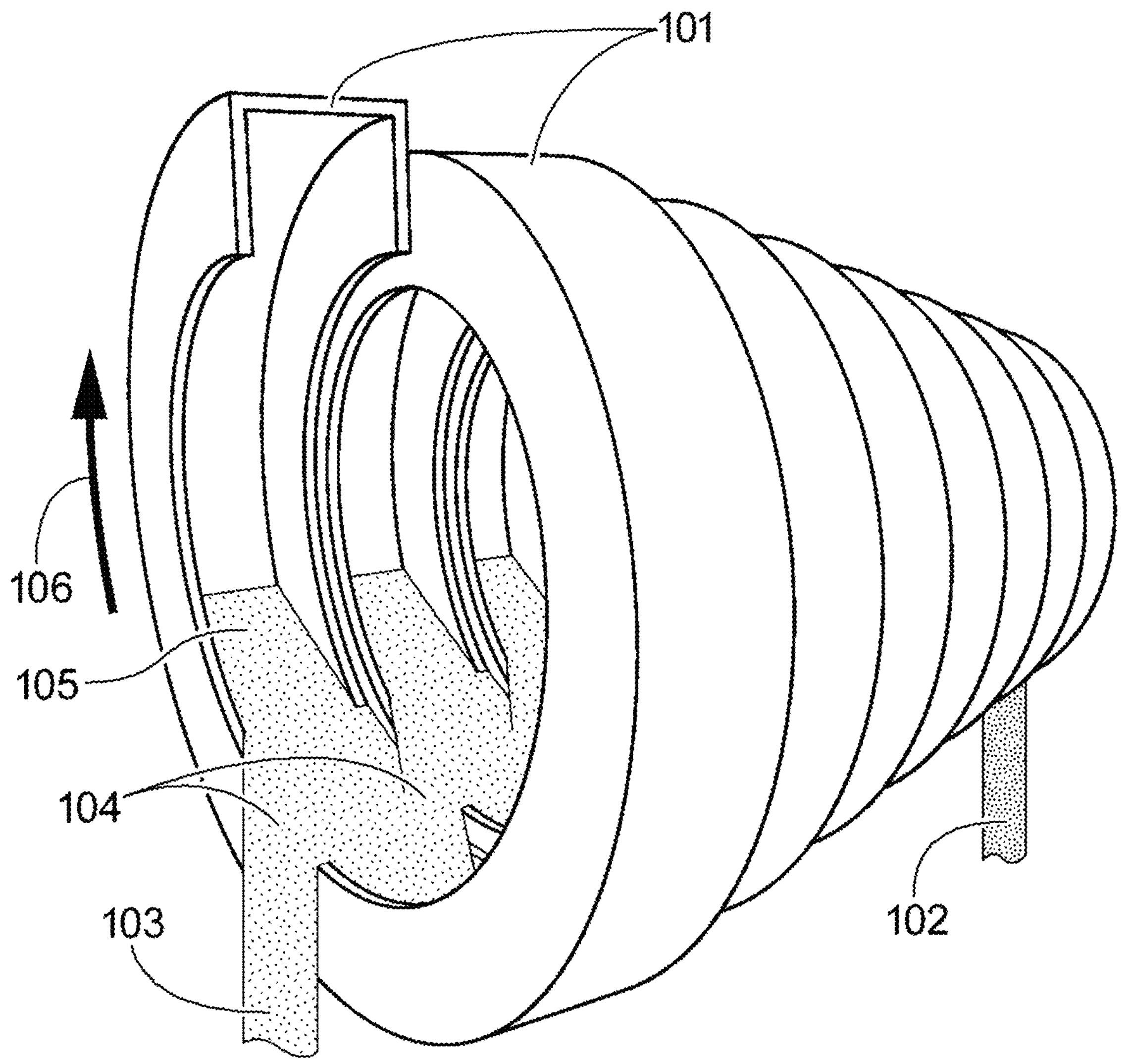
FIG. 1 is a perspective view of the disclosed apparatus with a granular mixture inside.

A preferred embodiment of the apparatus shown in FIG. 1 is a channel 101 of sufficient length, rectangular in cross-section and open at the top and ends. It is curved along a single-threaded left-handed helical spiral coiled around a regular cone, and the top side of the channel is directed towards the axis of the said cone. The dimensions of the cross-section of the channel decrease along the length of the channel in proportion to the decrease in the radius of curvature of the helical spiral along which the said channel is curved.

A preferred embodiment of the apparatus, shown in the perspective view of FIG. 1, can be described in a terms of a front part and a rear part. The front part of the apparatus is shown in the left part of FIG. 1, and the rear part of the apparatus is shown in the right part of FIG. 1. This definition of the front and rear parts will be referenced hereafter.

FIG. 1 also shows the granular mixture of particles 105, which is comprised of different densities and similar sizes, which rotates inside the turns of the channel of the apparatus. The areas 104 denote where the excess mixture is poured out of the channel. The resulting fraction of the mixture enriched in dense particles is shown as 102. The resulting fraction of the mixture depleted of dense particles is shown as 103. Arrow 106 shows the direction of the rotation of the apparatus.

Figure 2:
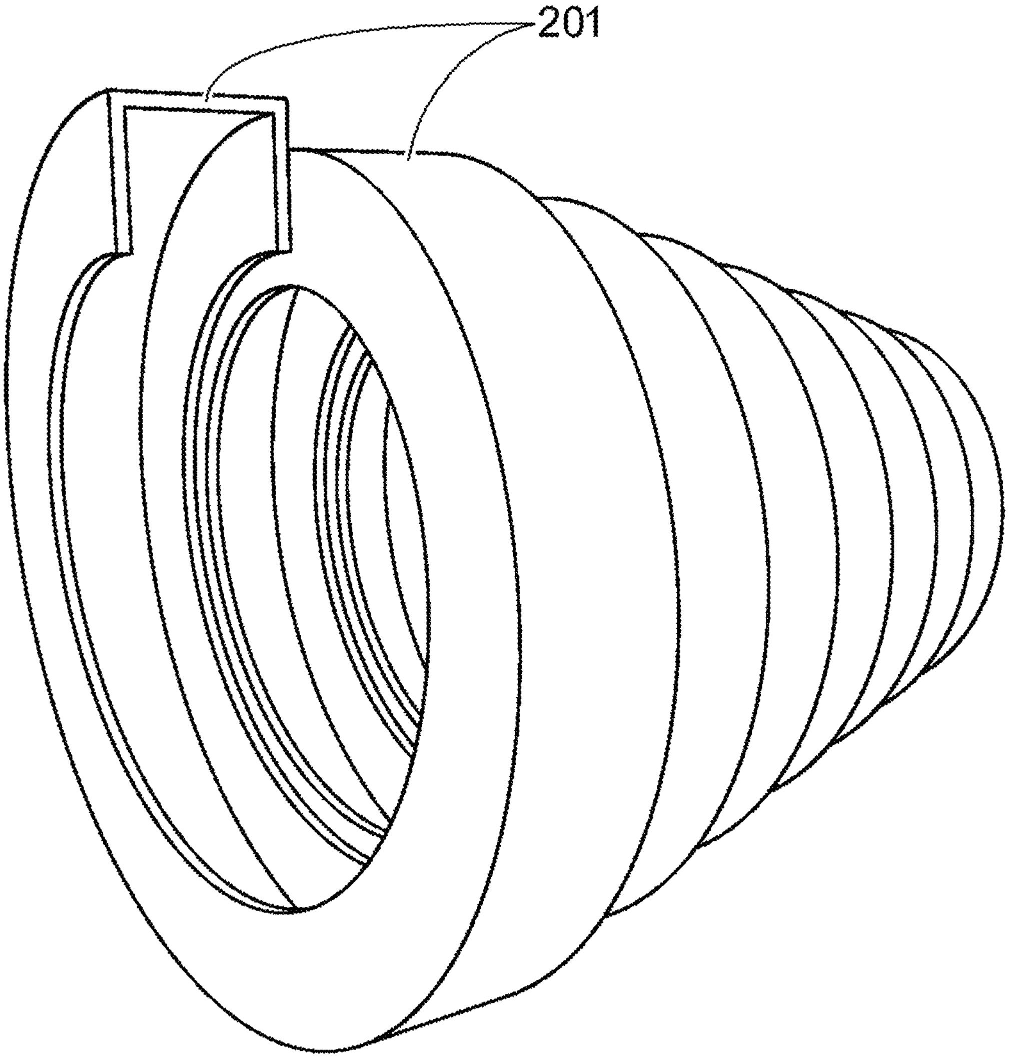
FIG. 2 is a perspective view of the disclosed apparatus without a granular mixture inside.

FIG. 2 shows a perspective view of the disclosed apparatus without the granular mixture inside.

Figure 3:
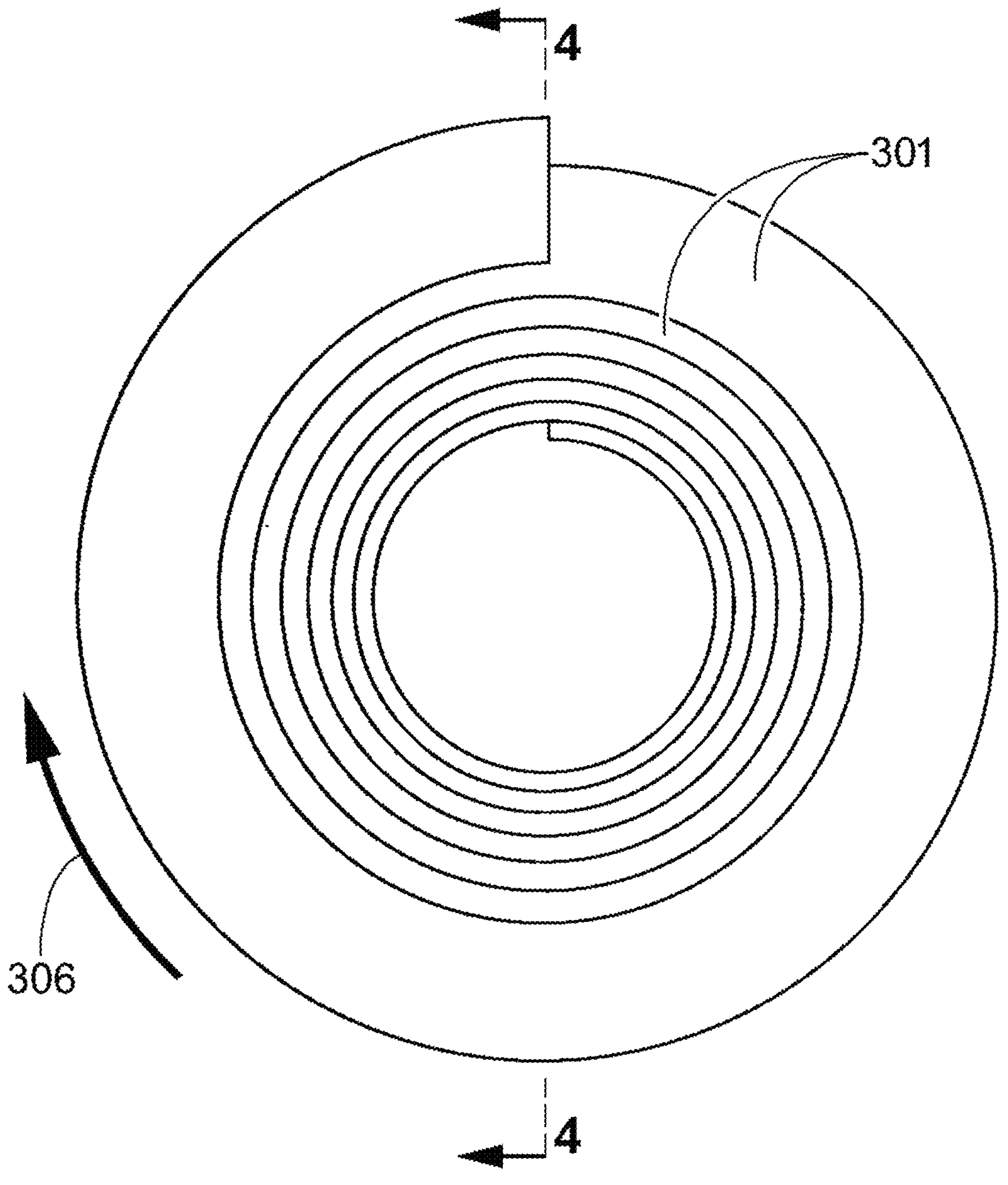
FIG. 3 shows a frontal view of the disclosed apparatus and defines vertical longitudinal section 4-4.

FIG. 3 shows the frontal projection of the disclosed apparatus, which shows the decrease in the radius of curvature of the channel 301 from the front part to the rear part of the apparatus. The direction of the working rotation of the apparatus 306 is also shown. Line 4-4 defines the plane of the vertical longitudinal section of the apparatus.

Figure 4:
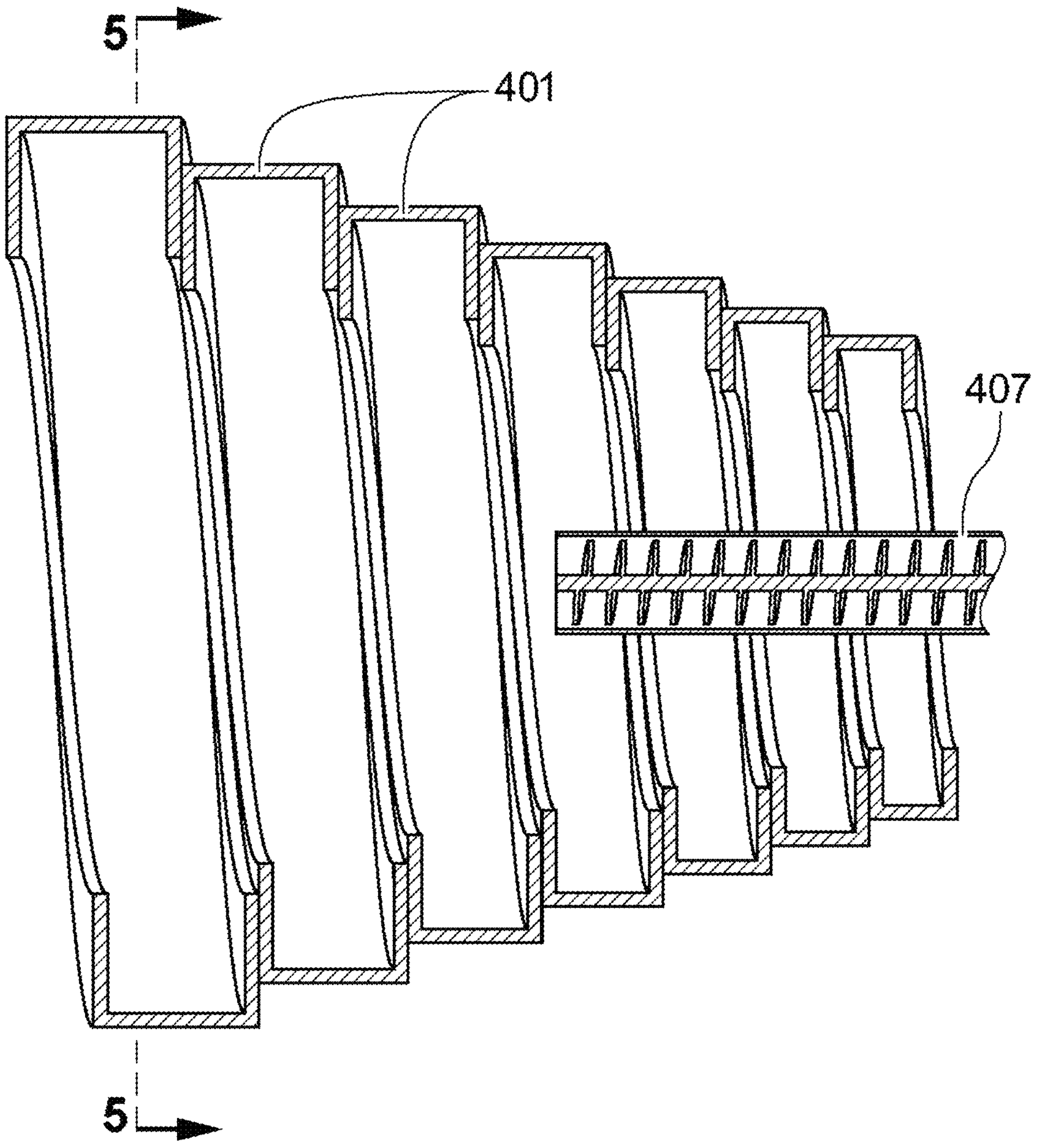
FIG. 4 shows vertical longitudinal section 4-4 of the disclosed apparatus without a granular mixture inside and defines vertical transversal section 5-5.

FIG. 4 shows a vertical longitudinal section 4-4 of the disclosed apparatus without the granular mixture inside and is oriented with the front part of the apparatus on the left and the rear part of the apparatus on the right. FIG. 4 also shows a decrease in the height of the walls and a decrease in the width of the bottom of the channel 401 along the length of the apparatus in proportion to the decrease in the radius of curvature of the channel. Line 5-5 defines the plane of the vertical transversal section of the apparatus. FIG. 4 also shows a screw conveyor 407, which was not shown in prior figures, as an example of a possible means for supplying a raw dry granular mixture inside the apparatus.

Figure 5:
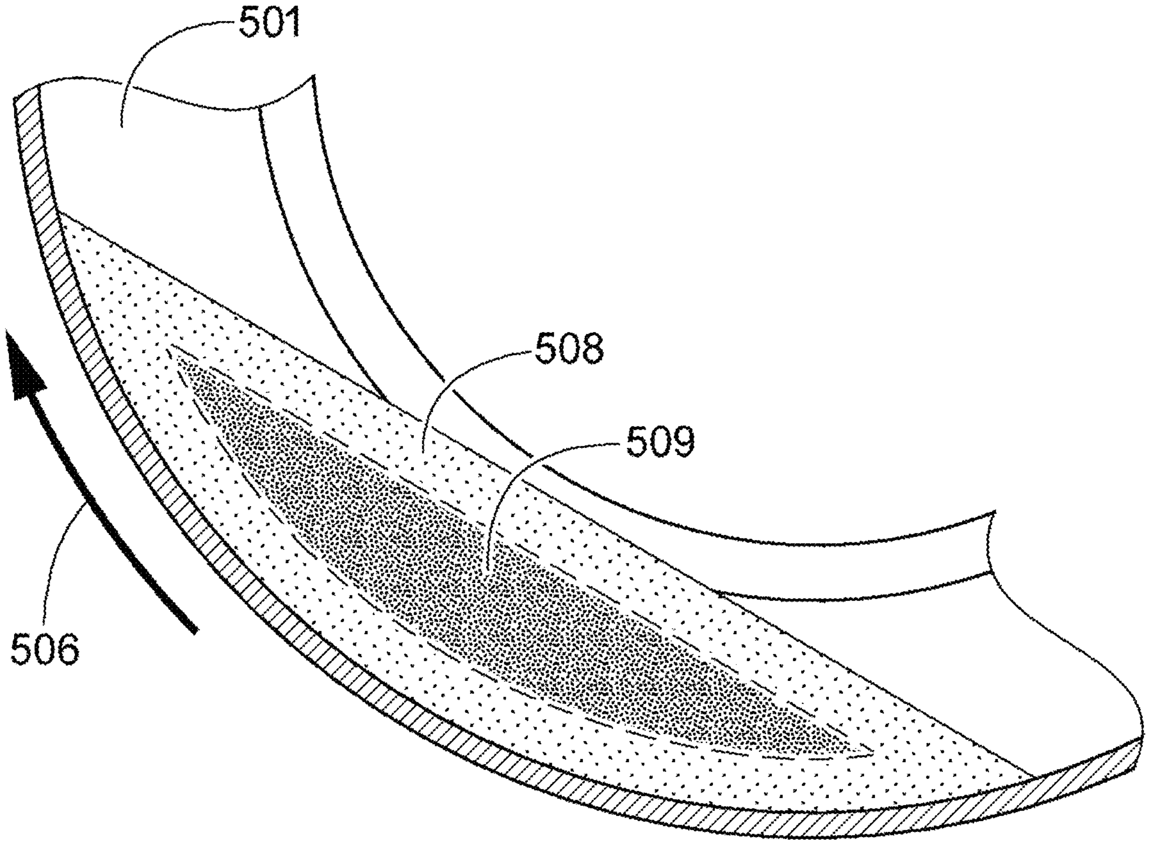
FIG. 5 is an informal schematic representation of a segment of a vertical transversal section 5-5 of the disclosed apparatus with a granular mixture inside, and depicts the spatial distribution of particles of a granular mixture of different densities, which are obtained as a result of rotation of the mixture inside the disclosed apparatus.

FIG. 5 shows the uneven spatial distribution of particles of varying density inside the volume of the granular mixture. The depicted distribution of particles results from the sedimentation of denser particles to the central area 509 of the mixture volume and the radial movement of less dense particles to the outer borders 508 of the mixture volume. This distribution is obtained by rotating the granular mixture Inside the turns of the channel 501 by rotating in the direction 506, according to the method known from the prior art.

When the disclosed apparatus rotates, the processes described above occur in each of the turns of the curved channel 101 forming the said apparatus. When rotating the curved channel 101, the granular mixture 105 inside it also rotates, as a result of which it makes a translational movement along the longitudinal axis of the apparatus from the front part to the rear part of the apparatus.

The curved channel 101 can hold a limited volume of granular mixture in each of its turns. The maximum volume is determined by the height of the walls of the curved channel, the width of its bottom, the radius of curvature of the said turn, and the speed of rotation of the said channel.

The preferred embodiment of the apparatus is formed by a curved channel where the height of the walls, the width of the bottom and the radius of curvature decrease along the helical spiral from the front part to the rear part of the apparatus.

As a result, the volume of mixture that can be held by the curved channel of said apparatus gradually decreases along the direction of movement of the mixture within the channel, from the front part to the rear part of the apparatus. When moving the mixture from the front part to the rear of the apparatus, excess mixture occurs, which the segments of the said channel cannot hold. Also, excess mixture can be formed by feeding of the raw mixture inside the apparatus with the rate higher than the rate fraction 102 is produced.

Figure 6:
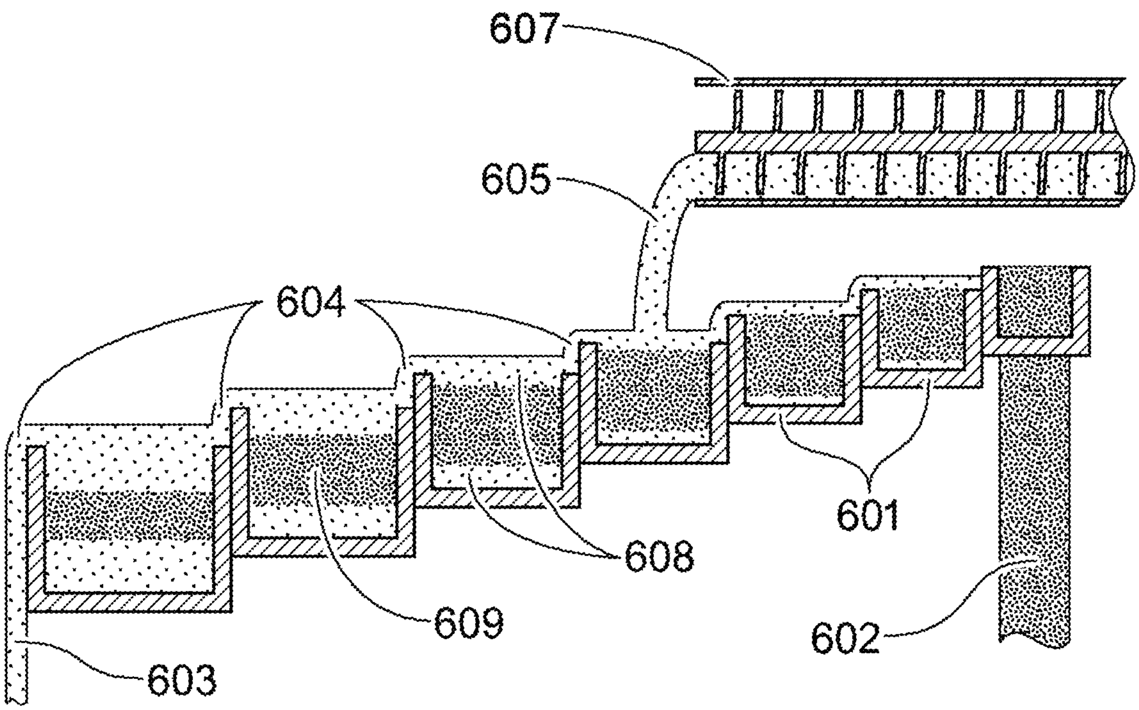
FIG. 6 is an informal schematic representation of the lower part of the vertical longitudinal section 4-4 of the disclosed apparatus with the granular mixture inside, and depicts the longitudinal movements of the granular mixture parts inside the said apparatus.

FIG. 6 schematically shows the lower part of the section 4-4 of the apparatus with the front part of the apparatus on the left and the rear part on the right. This cross-section shows the adjacent turns of the curved channel 601 with the mixture 605 inside, which is fed into the apparatus by means of the screw conveyor 607. Also shown is a decrease in the height of the walls, the width of the bottom, and the radius of curvature of the channel 601 from the front to the rear of the apparatus.

The wall of the channel 601 that is closer to the front side of the apparatus is hereinafter referred to as the front wall of the channel, and the wall of the channel 601 that is closer to the rear side of the apparatus is hereinafter referred to as the rear wall of the channel.

The upper edge of the front wall of the channel 601 is located higher than the upper edge of the rear wall of the previous turn. Therefore the above-mentioned excess of granular mixture in any particular turn of the channel can be poured only into the previous turn, closer to the front part of the apparatus, without the use of additional means. Also, the difference in height between the walls of adjacent turns of the channel can be achieved by tilting the axis of the apparatus to the horizon. The excess of the mixture pouring out into the previous turns of the channel of the apparatus is shown as 604.

An excess granular mixture 604 represent the outer part of the volumes 608 of the mixture in the channel which are depleted of dense particles and are poured out into the previous turns of the channel of the apparatus. This pouring action creates a flow of a low-density particles from the rear part to the front part of the apparatus. At the same time, the inner parts 609 of the mixture volumes are enriched in dense particles which are moved from the front part to the rear part of the apparatus as the apparatus rotates.

The excess mixture from the first turn of the channel, closest to the front of the apparatus, poures out of the apparatus and forms the resulting fraction 603 of the mixture, which is depleted of dense particles. The central part 609 of the mixture, which is moved to the rear of the apparatus, poures out from the last turn of the channel at the rear part of the apparatus and forms the resulting fraction 602 of the mixture which is enriched in dense particles.

As described above, the initial mixture is separated into fraction 603, depleted in dense particles, and fraction 602, enriched in dense particles, without the use of any means for extracting particles from certain areas of the volume of the granular mixture. This is a technical result of the application of the disclosed apparatus and proves the possibility of industrial application of the said apparatus for separating dry granular mixtures into fractions differing in the content of dense particles.

BEST MODE FOR CARRYING OUT THE INVENTION

Other embodiments of the disclosed apparatus can be formed by combinations of channel segments of arbitrary cross-sectional shapes and proportions, curved along flat and helical spirals, single-threaded and multi-threaded, left-handed and right-handed, coiled around cylinders, prisms, cones and pyramids, regular and irregular. An exact geometry of the apparatus and the number of channel turns may be determined by practical feasibility of its manufacturing, the specific mixture of particles being separated, and other heuristics derives from testing for a particular application.

The adjacent walls of adjacent turns of the channel can be combined into the single common wall for feasibility of manufacturing.

The channel can be equipped with additional elements that prevent unwanted sliding of the mixture inside the channel, including, but not limited to, notches, protrusions, ribs, fins, lags etc.

The raw granular mixture can be sieved to the certain particle size range before feeding for better separation quality.

Multiple disclosed apparatuses can be combined in a sequence for better separation quality, in parallel for better separation performance, or both for better quality and performance.

The means for rotating and tilting the disclosed apparatus, the means for feeding the raw mixture, and the means for collecting the resulting fractions of the mixture are determined by the practical considerations of the manufacturing, operation and application of the said apparatus.

The invention claimed is:

1. An apparatus for separating dry granular mixture of particles of different densities into a first fraction and a second fraction, the first fraction having particles of higher density than the second fraction, the apparatus comprising:

a channel spiraled about an apparatus axis of rotation into a plurality of turns successively arranged from a front apparatus end to a rear apparatus end, the apparatus axis of rotation extending longitudinally from the front apparatus end to the rear apparatus end, the channel configured to rotate about the apparatus axis of rotation, each of the plurality of turns having a granular mixture retention volume having an open radial inner side that faces toward the apparatus axis of rotation, the open radial inner side of the granular mixture retention volume of each turn from the front apparatus end to the rear apparatus end being successively closer to the apparatus axis of rotation, wherein, when the apparatus is rotated about the apparatus axis of rotation and a granular mixture of particles of different densities is introduced into the channel, the apparatus causes spatial separation of the granular mixture within the granular mixture retention volume of each turn of the channel into the first fraction and the second fraction by producing continuous or discrete avalanches in a surface of the granular mixture whereby, within the granular mixture retention volume of each turn, the first fraction is moved towards a center of a volume of the granular mixture and the second fraction is moved radially outward from the center of the volume of the granular mixture.

2. The apparatus of claim 1, wherein the channel has a rectangular shape, and wherein the open radial inner side is an opening in the rectangular shape.

3. The apparatus of claim 1, wherein the channel comprises one or more walls forming the granular mixture retention volume of each of the plurality of turns, and wherein the open radial inner side is the one or more walls having an opening facing toward the apparatus axis of rotation.

4. The apparatus of claim 1, wherein each of the plurality of turns comprises one or more walls forming the granular mixture retention volume, and wherein at least one wall of a first turn of the plurality of turns is connected to at least one wall of a second turn of the plurality of turns along a plane perpendicular to the apparatus axis of rotation for retaining the avalanches in the surface of the granular mixture moving between the first and second turns.

* * * * *